US012350210B2

(12) United States Patent
Higgins et al.

(10) Patent No.: US 12,350,210 B2
(45) Date of Patent: Jul. 8, 2025

(54) BED RAIL SYSTEM

(71) Applicants: Shawn P. Higgins, Huizhou (CN); Ignacio Navarro De Corcuera, Larnaca (CY)

(72) Inventors: Shawn P. Higgins, Huizhou (CN); Ignacio Navarro De Corcuera, Larnaca (CY)

(73) Assignee: Cross Innovations, LLC, Cheyenne, WY (US)

( * ) Notice: Subject to any disclaimer, the term of this patent is extended or adjusted under 35 U.S.C. 154(b) by 232 days.

(21) Appl. No.: 17/988,996

(22) Filed: Nov. 17, 2022

(65) Prior Publication Data

US 2024/0164963 A1 May 23, 2024

(51) Int. Cl.
*A61G 7/05* (2006.01)

(52) U.S. Cl.
CPC .......... *A61G 7/0508* (2016.11); *A61G 7/0524* (2016.11)

(58) Field of Classification Search
CPC ....... A47C 21/08; A47C 21/003; A47C 21/00; A47C 12/00; A47C 31/00; A47C 19/005; A47C 19/021; A47C 19/22; A47C 20/027; A47C 7/62; A47C 7/624; A61G 7/0513; A61G 7/053; A61G 7/0507; A61G 7/0508; A61G 7/0524; A61G 7/0518; Y10S 5/905; Y10S 362/801; Y10S 362/80; A61H 3/00; F21V 21/0885; F21V 21/08; F21V 21/088; F21V 21/145; F21V 33/0012; A47D 15/00; F21Y 2115/10; F21Y 2101/00; F21Y 2115/15; F21W 2111/08; F21W 2131/208; E04F 2011/1872; E04F 11/18
USPC ...... 5/425, 430, 426, 81.1 R, 662, 424, 600, 5/611, 613, 658, 905, 286, 428, 503.1; 362/130, 127, 277, 319, 368, 801, 157, 362/427, 197, 382; 135/67, 66; D6/718.3
See application file for complete search history.

(56) References Cited

U.S. PATENT DOCUMENTS

| | | | | |
|---|---|---|---|---|
| D208,607 S | | 9/1967 | Williams | |
| 3,863,282 A | * | 2/1975 | Stillwell | A61G 7/053 5/503.1 |

(Continued)

FOREIGN PATENT DOCUMENTS

| | | | | | |
|---|---|---|---|---|---|
| CN | 204192107 U | * | 3/2015 | | |
| FR | 2703229 A1 | * | 10/1994 | | A61G 7/0507 |
| KR | 20210146738 A | * | 12/2021 | | E04F 11/1802 |

OTHER PUBLICATIONS

"Lunderg Bed Rails for Elderly Adults Safety—with Motion Light & Non-Slip Handle—Bed Railings for Seniors & Surgery Patients." Amazon—Lunderg, https://a.co/d/hglfP9O (Year: 2022).*

(Continued)

*Primary Examiner* — Madison Emanski
(74) *Attorney, Agent, or Firm* — Daniel S. Bretzius; Dan B Law PLLC

(57) ABSTRACT

The disclosure describes and illustrates improvements to bed rails, to include easier assembly and lighting features. An embodiment of a bed rail ships to a user in four primary structural pieces, eliminating complicated user assembly. The present disclosure also describes a light bar disposed within the bed rail, with various lighting features. The improvements and inventions discussed herein provide a better user experience and increase the usability of the bed rail.

8 Claims, 18 Drawing Sheets

(56) References Cited

U.S. PATENT DOCUMENTS

| | | | | |
|---|---|---|---|---|
| 5,400,450 | A | 3/1995 | Leoutsakos | |
| 5,437,067 | A * | 8/1995 | Bernstein | A61G 7/0518 5/426 |
| 5,596,776 | A * | 1/1997 | Huang | A47C 21/08 5/426 |
| 6,058,531 | A | 5/2000 | Carroll | |
| 6,138,301 | A | 10/2000 | Battiston | |
| D433,856 | S | 11/2000 | Blum | |
| D445,614 | S | 7/2001 | Sommerfeld et al. | |
| 6,401,280 | B1 | 6/2002 | Baker | |
| 6,425,154 | B1 | 7/2002 | O'Connell | |
| 6,539,569 | B2 | 4/2003 | O'Connell | |
| 7,373,679 | B2 | 5/2008 | Miller | |
| 7,775,228 | B2 | 8/2010 | Clark | |
| 7,797,775 | B2 | 9/2010 | Miller | |
| 7,901,115 | B2 * | 3/2011 | Chien | H04N 23/65 362/382 |
| 7,987,538 | B1 * | 8/2011 | Kimball | A61G 7/053 5/426 |
| D718,968 | S | 12/2014 | Zakel | |
| 8,973,192 | B2 | 3/2015 | Miller | |
| D798,641 | S | 10/2017 | Miller | |
| 9,827,156 | B2 * | 11/2017 | Zerhusen | A61G 7/0514 |
| D906,749 | S | 1/2021 | Teng | |
| D915,118 | S | 4/2021 | Savioli | |
| 2002/0078502 | A1 | 6/2002 | Baker | |
| 2011/0185507 | A1 | 8/2011 | Abernathey | |
| 2012/0110735 | A1 * | 5/2012 | Andrienko | A61G 7/0524 5/430 |
| 2013/0292622 | A1 * | 11/2013 | Waite | A61H 3/00 256/65.01 |
| 2015/0216750 | A1 * | 8/2015 | Miller | A61G 7/0518 29/428 |
| 2016/0374881 | A1 * | 12/2016 | Baiera | A61G 7/053 5/507.1 |
| 2018/0027982 | A1 * | 2/2018 | Mazzeo | A47C 21/08 |
| 2020/0323716 | A1 | 10/2020 | Gallagher | |

OTHER PUBLICATIONS

"Bed Rails for Elderly Adults" Tomreky, Amazon, NPL, Date: Jul. 12, 2022 www.amazon.com/Elderly-Seniors-Storage-Stabilizer-Support/dp/B0B6BJ6DGL?source=ps-sl-shoppingads-lpcontext&ref _=fplfs&smid (Year: 2022).*

"LumaRail Assembly Tutorial" YouTube, Platinum Health Group, Date: Nov. 13, 2015, https://www.youtube.com/watch?v=ssR21ylfaiA (Year: 2015).*

* cited by examiner

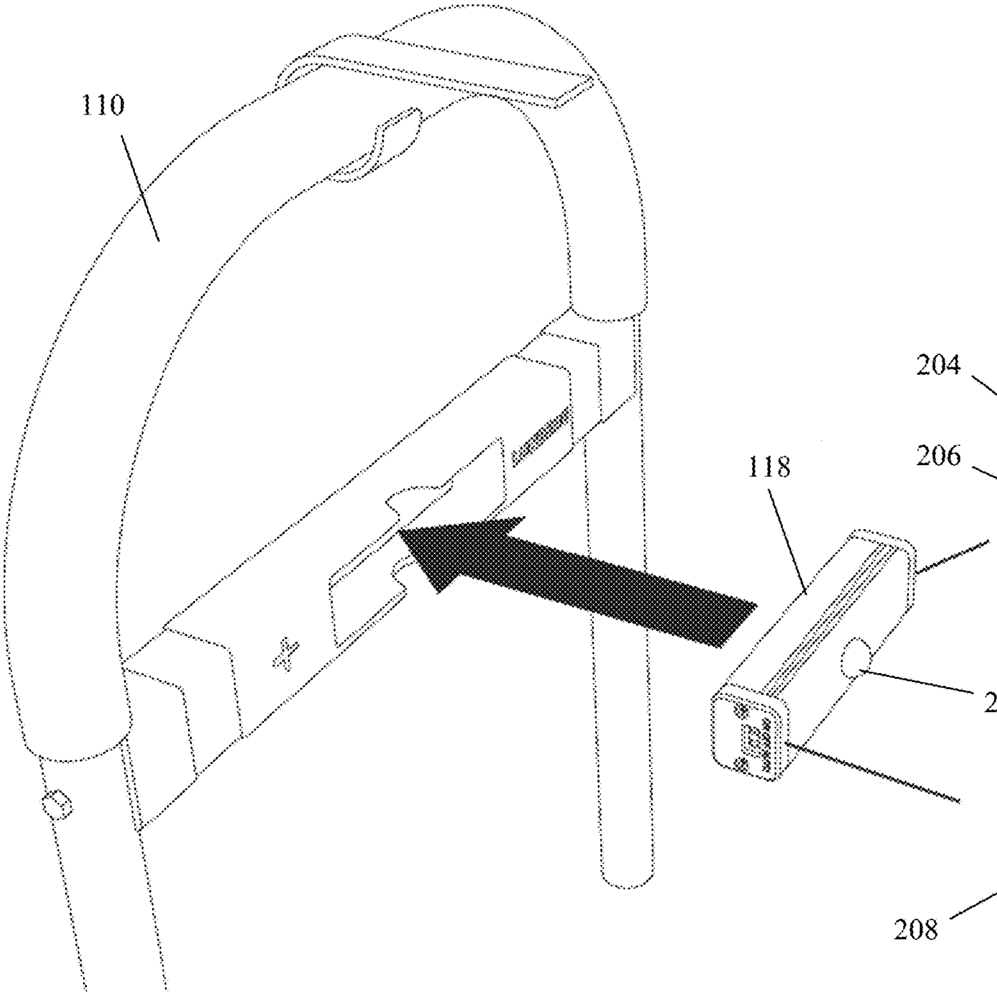
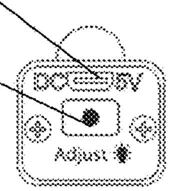
FIG. 10
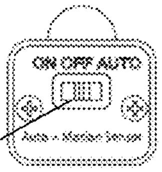
FIG. 11
FIG. 9

BED RAIL SYSTEM

FIELD OF DISCLOSURE

The present disclosure relates to bed rails used to assist users into and out of bed. In some embodiments, the disclosure relates to specific features of the bed rail, including a removable lighting component.

BACKGROUND

The typical bed and mattress utilized in one's home is open on all sides to permit entry and exit without interference. Unfortunately, an individual's age (old or young) and health may make entry and exit of one's bed a more difficult procedure. Others may benefit from a rail or other guard to prevent falls while sleeping in the bed.

Bed rails solve several of these problems, by allowing a support and surface for gripping during entry, exit, and use of one's bed. Some bed rails also provide sufficient barriers to prevent accidental falls from the bed. However, even with the advent of several iterations of bed rails, there are many desirable functions and features still not seen in the field.

SUMMARY

As shown and described herein, this disclosure describes and illustrates improvements to bed rails. Some improvements disclosed herein include easier assembly and lighting features. By way of example, the present disclosure describes a bed rail that ships to a user in four primary pieces, eliminating complicated user assembly. The present disclosure also describes lighting features within the bed rail. The improvements and inventions discussed herein provide a better user experience and increase the usability of the bed rail.

Additional advantages and details are also described herein with reference to the provided drawings. Some embodiments of the bed rail may incorporate only one of the improvements discussed herein, while other embodiments may include a combination of such improvements. Embodiments of the bed rail are not restricted to the examples illustrated in the drawings, as, due to the number of possible embodiments, only some embodiments can be shown in the figures.

BRIEF DESCRIPTION OF THE DRAWINGS

The disclosure below is made with reference to the drawings, in which,

FIG. 9 is a perspective view coupling of an embodiment of a light bar with an embodiment of a bed rail;

FIG. 10 is a first end view of an embodiment of a light bar;

FIG. 11 is a second end view of an embodiment of a light bar;

DETAILED DESCRIPTION

Bed rails discussed herein can include one or more different types of the improvements disclosed herein. In some embodiments, the bed rail may be configured to minimize user assembly, while other embodiments may also or instead include an improved lighting component.

Figure 1:
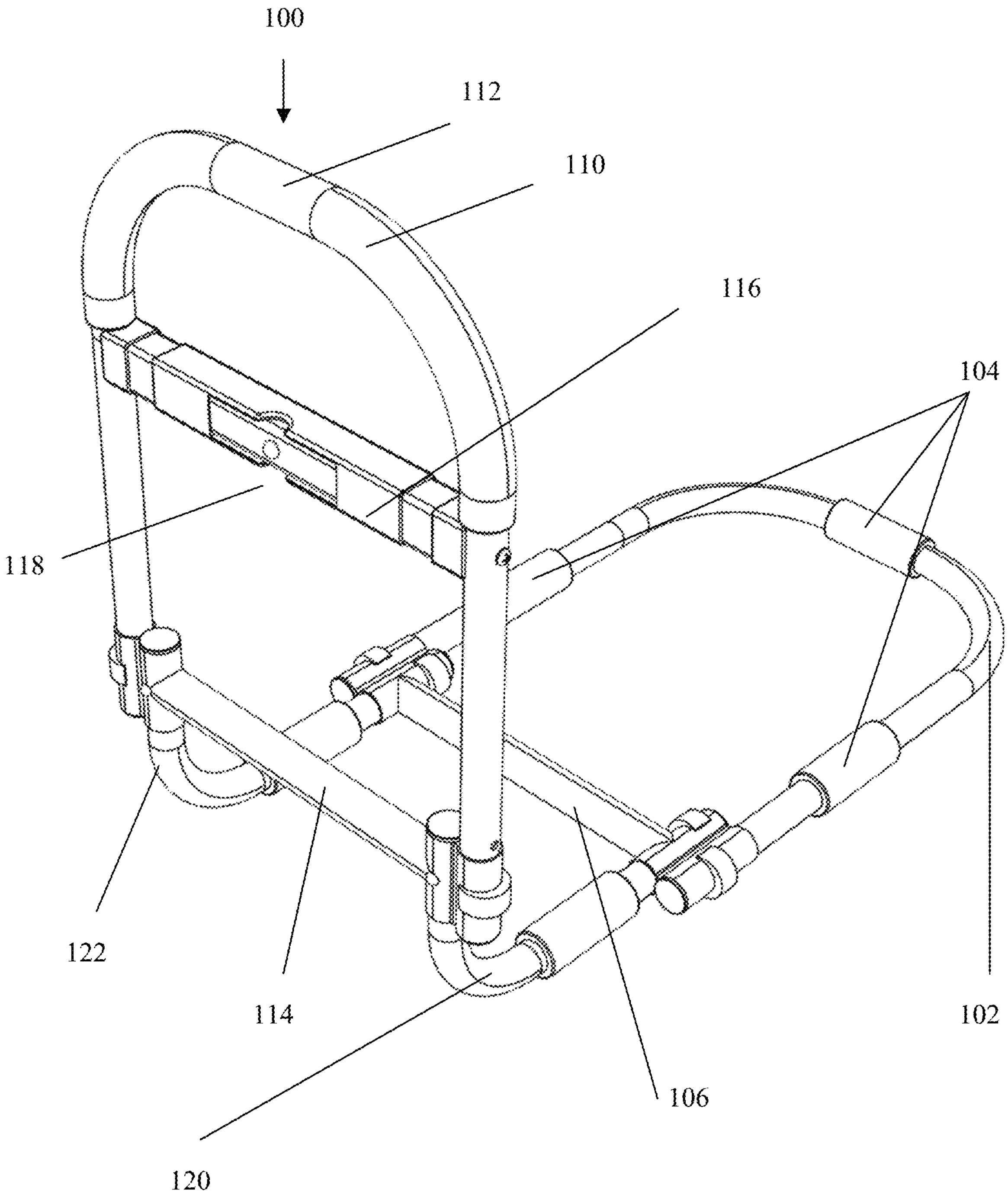
FIG. 1 is a top, right, and rear perspective view of an embodiment of a bed rail.

One embodiment of a bed rail is exemplarily shown in the perspective views of FIG. 1 FIG. 2, FIG. 3, and FIG. 4. FIG. 1 shows a perspective view of an embodiment of a bed rail, showing the top, rear, and right sides of the bed rail 100. As can be seen in the embodiment of FIG. 1, the bed rail is generally comprised of a frame formed by cylindrical or rectangular members, wherein said members can be solid or hollow. The frame members may be constructed of any of various materials, including those having appropriate strength and weight characteristics, such as aluminum or acrylonitrile butadiene styrene ("ABS").

Figure 2:
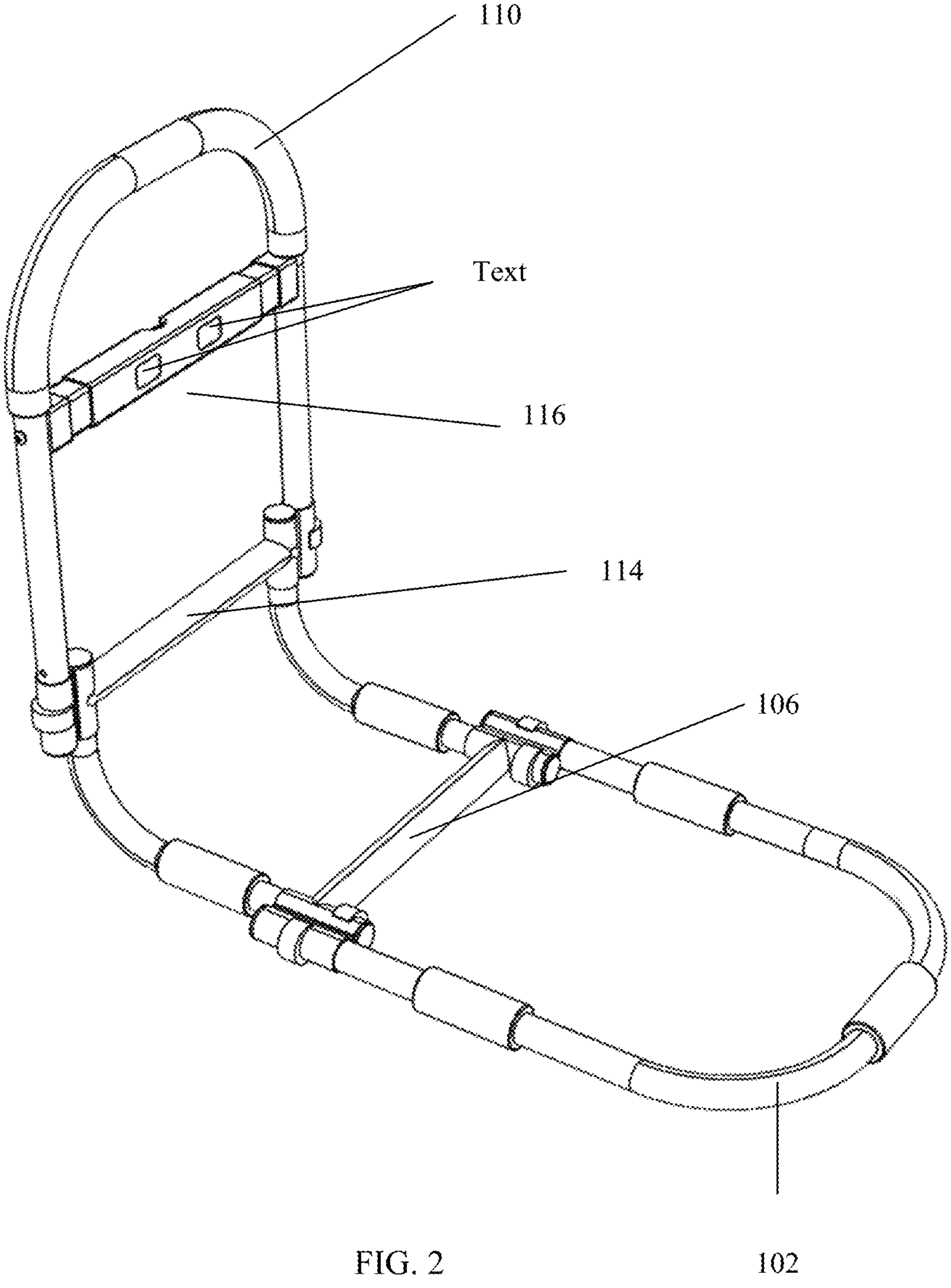
FIG. 2 is a top, right, and front perspective view of an embodiment of a bed rail.
Figure 3:
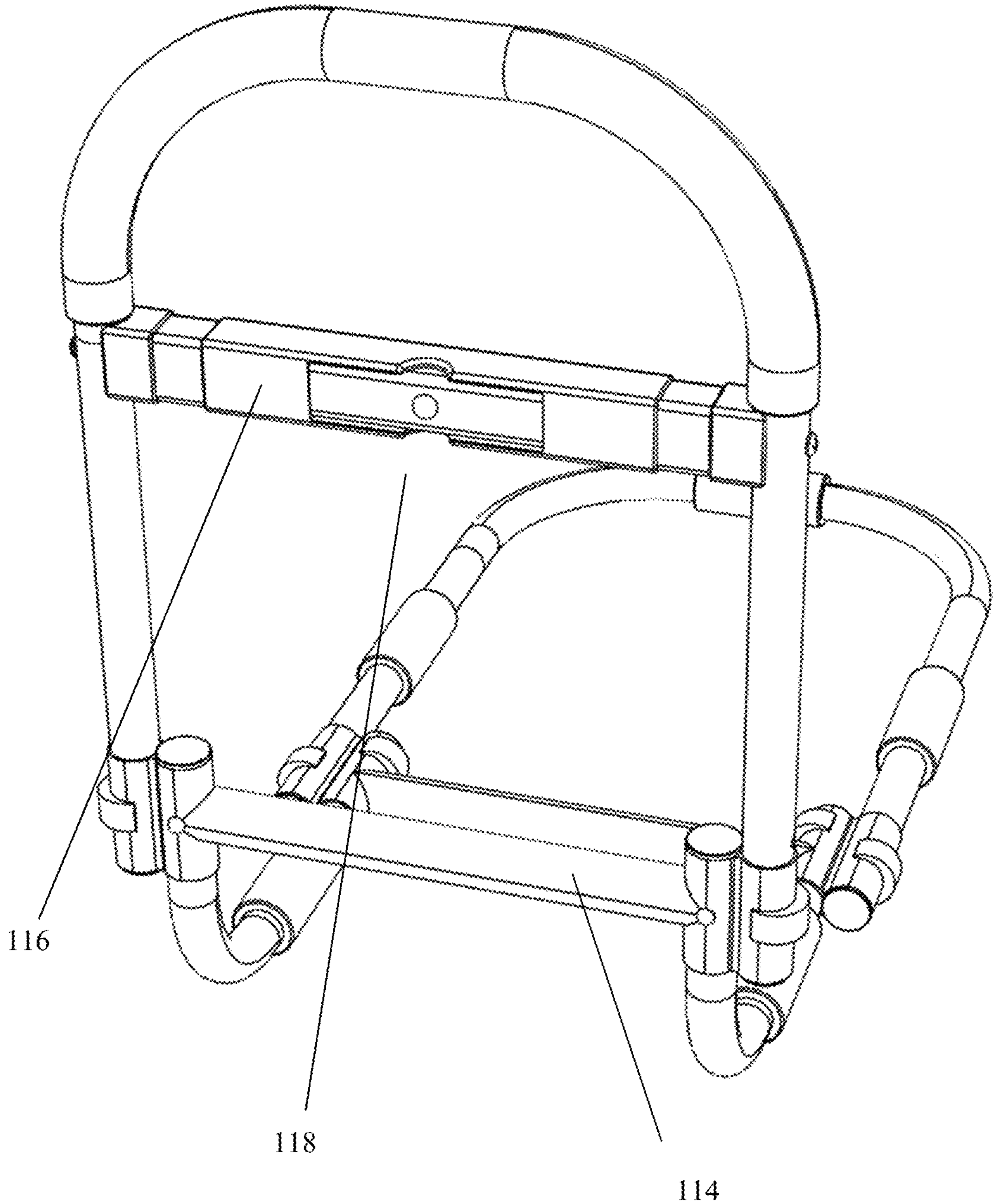
FIG. 3 is a top, right, and rear perspective view of an embodiment of a bed rail.

With continued reference to FIG. 1, FIG. 2, and FIG. 3, various frame members are discussed herein. First, the bed rail 100 may include a u-shaped bottom member 102. The bottom member 102 may include one or more padding cylinders or sleeves 104 to prevent slippage of the bed rail 100 when in use. In the embodiment shown in FIG. 1, three such padding cylinders or sleeves 104 are shown, with one distally attached to the rounded middle portion of the bottom member 102, and two padding cylinders positioned such that they will be more proximal to the edge of the user's bed when in use. The bottom member 102 may also include a cross member 106.

Figure 4:
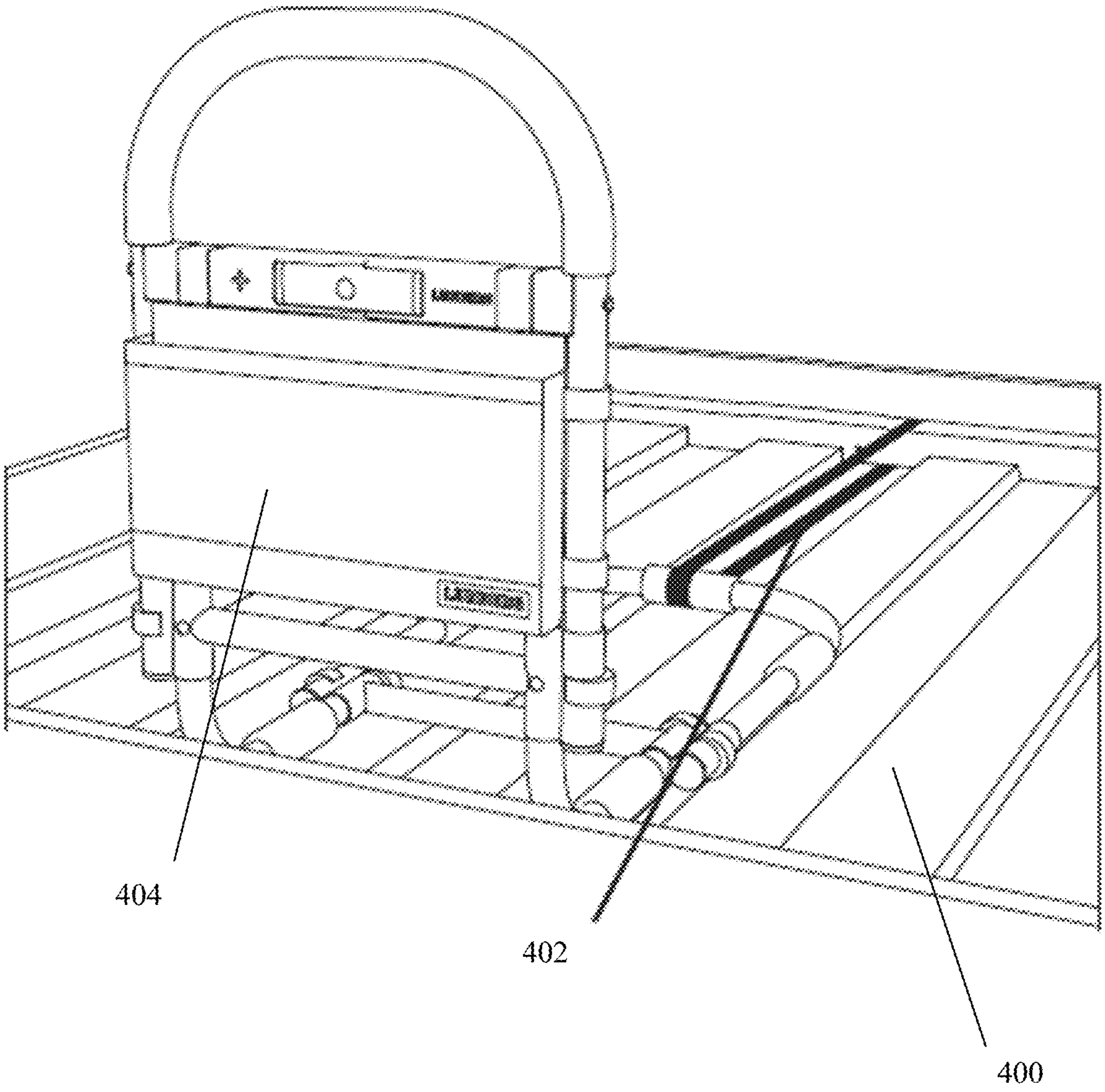
FIG. 4 is a top, right, and rear perspective view of an embodiment of a bed rail in use.
Figure 5:
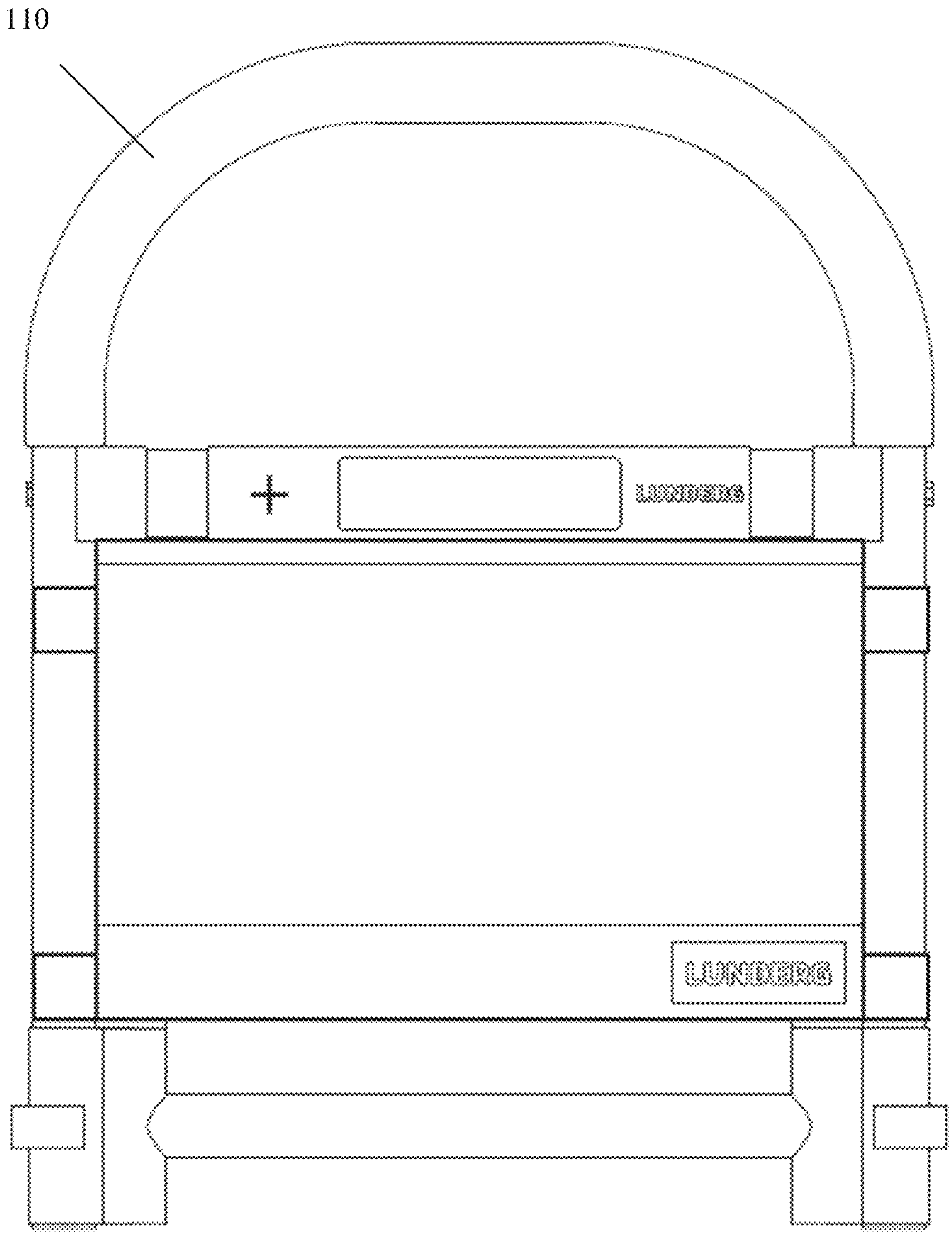
FIG. 5 is a rear view of an embodiment of an upright member of a bed rail.
Figure 6:
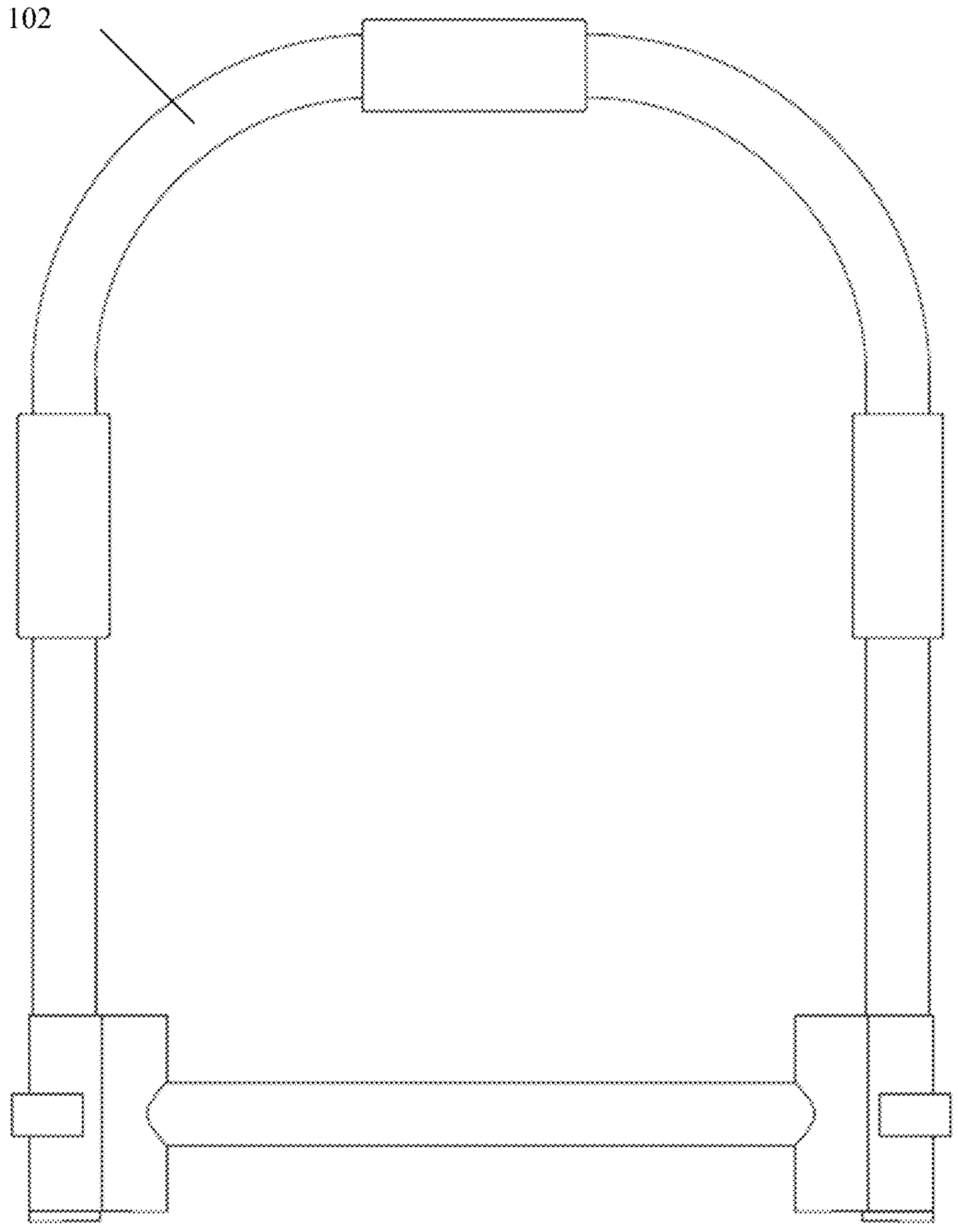
FIG. 6 is a top view of an embodiment of an bottom member of a bed rail.
Figure 7:
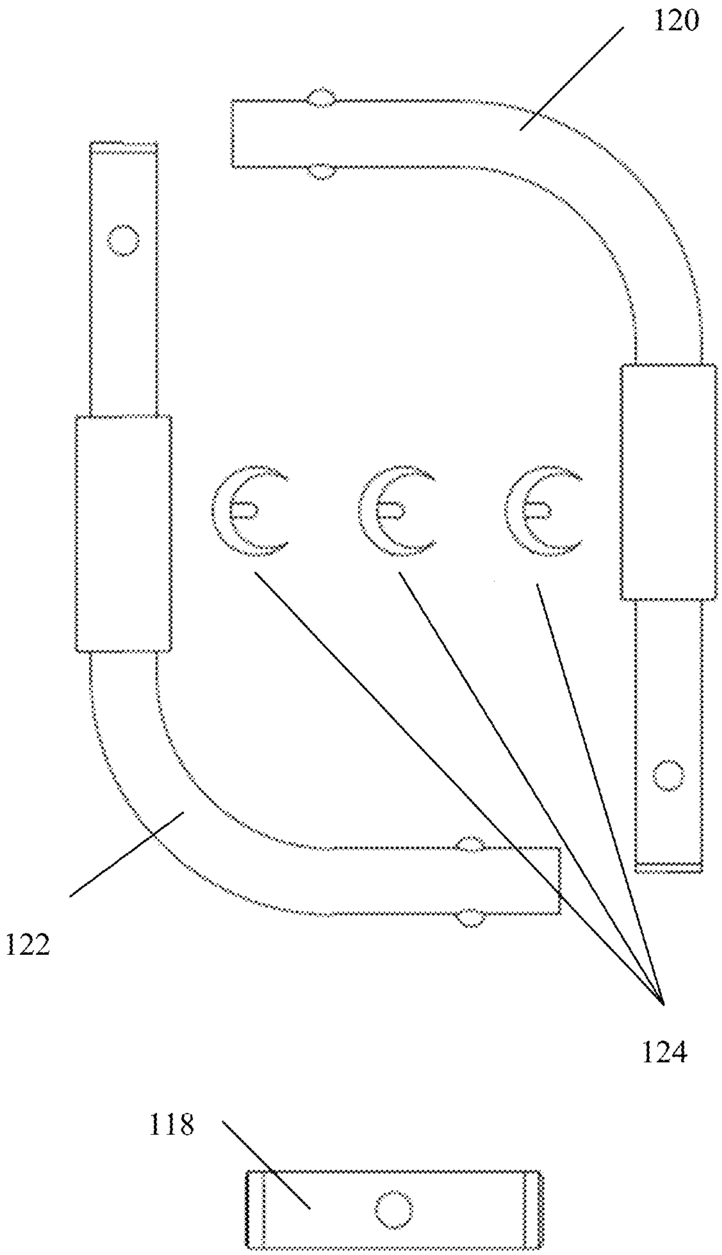
FIG. 7 is a view of an embodiment of l-bars, c-clips, and light bar of a bed rail.

As shown in FIG. 4, when the bed rail 100 is in use, the bottom member 102 is placed on top of the bed foundation 400 and under the mattress (not shown). The bed rail 100 extends from one side of a user's bed to the other, to provide foundational support and stability for the remainder of the bed rail 100. In an embodiment, the bed rail 100 can include a strap 402 capable of being coupled to the bottom member 102 and the user's bed frame, to provide further stability of the bed rail 100. In some embodiments, the bed rail 100 may also include a storage compartment 404.

The bed rail 100 may also include a generally u-shaped upright member 110 disposed approximately perpendicular to the bottom member 102. The upright member 110 can include one or more cross members 114, 116. The cross members 114, 116 may be generally linear, rectangular, or cylindrical. As discussed in greater detail below, one of the cross members 114, 116 may also include a cavity with a light bar 118 disposed therein. The bed rail 100 may also include a first l-shaped member 120 and a second l-shaped member 122. The l-shaped members 120, 122 are configured to couple to both the bottom member 102 and upright member 110 to complete the assembly, as is shown and described in further detail below.

Figure 8:
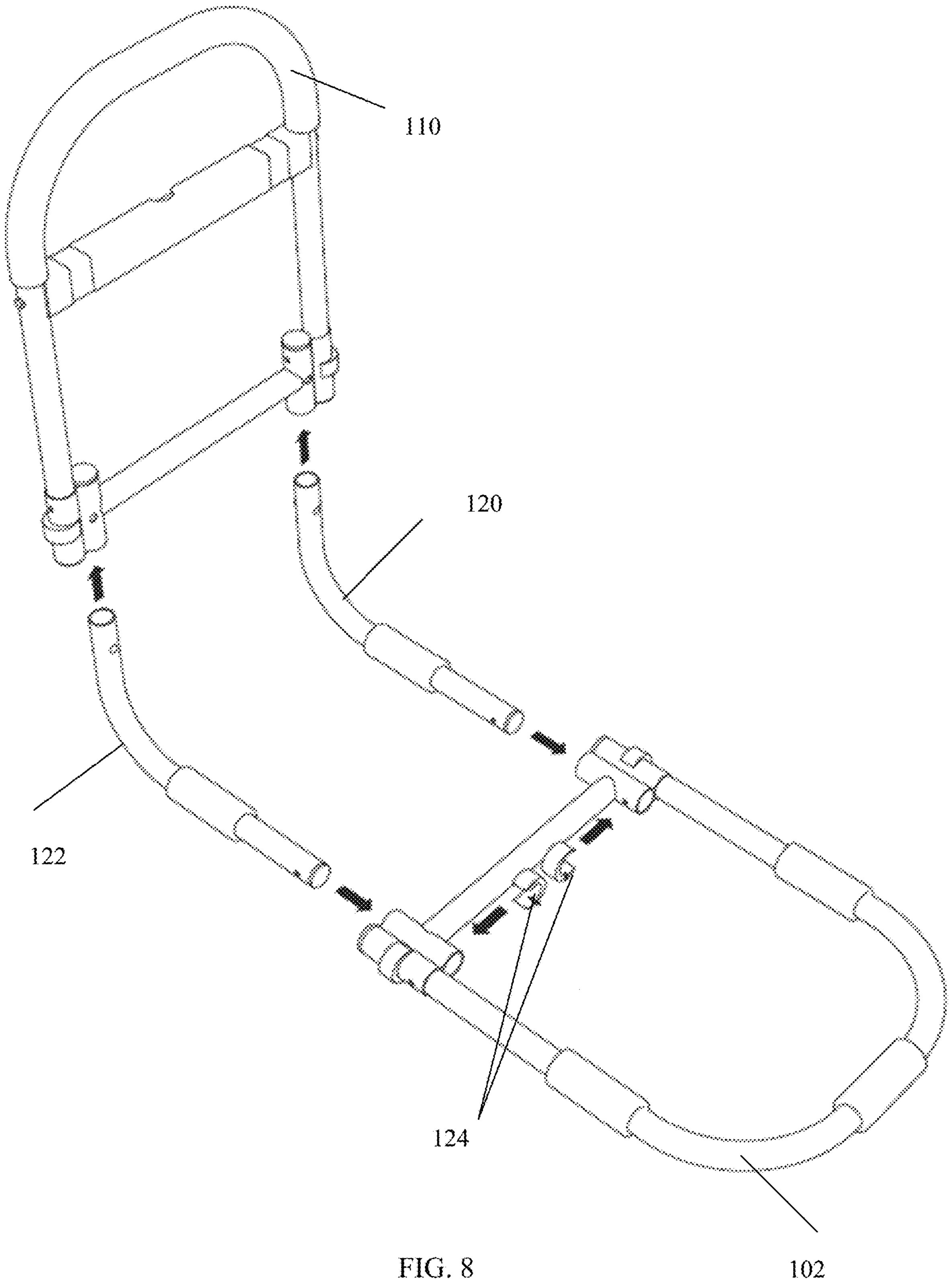
FIG. 8 is a perspective view of assembly of an embodiment of a bed rail.

With reference to FIG. 5, FIG. 6, FIG. 7, and FIG. 8, the bed rail 100 can be comprised of only four primary structural parts to facilitate easy user assembly. More specifically, the referenced figures illustrate a monolithic or preformed upright member 110, bottom member 102, first l-shaped member 120, and second l-shaped member 122. The assembly kit also includes a light bar 118 and three c-shaped clips 124 (only two of which are required, the third being a spare). As shown in FIG. 8, the bed rail 100 is assembled by coupling the upright member 110 to each of the l-shaped members 120, 122, by coupling the bottom member 102 to each of the l-shaped members 120, 122, and by securing the bottom 102 to the l-shaped members 120 using two of the three provided c-clips 124.

As referenced earlier and with more specific reference to FIG. 9, the upright member 110 or cross member 116 may include a light bar 118 coupled to or disposed therein. In an embodiment, cross member 116 can include a recess or space configured to receive the light bar 118, as exemplarily shown in FIG. 9. The light bar 118 can be generally rectangular and can include a central light feature 202 facing the user. With reference to FIG. 10, one end of the light bar 118 can include a charging port (e.g. micro USB) and a brightness adjustment button 206. A user may press the brightness adjustment button 206 to adjust the brightness of the light, as further discussed herein. With reference to FIG. 11, a second end of the light bar 118 can include an LED switch with a slider selector 208 between modes of "ON", "OFF", and "AUTO". The "ON" selection turns the light on, the "OFF" selection turns the light off, and the "AUTO" selection enables motion sensor detection in dark environments.

Figure 12:
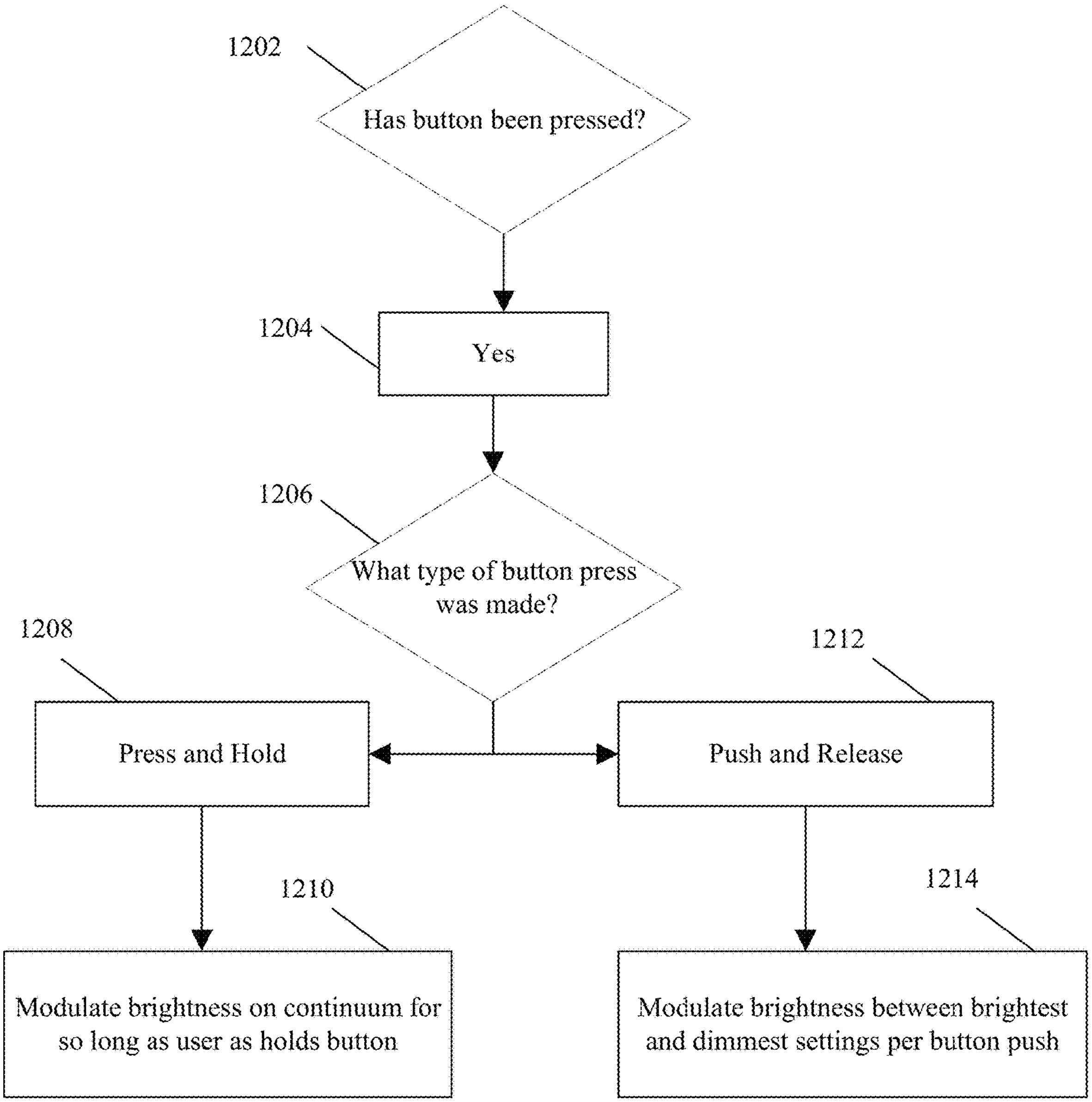
FIG. 12 is a flow chart of a light intensity control scheme method.

When in use in the "ON" or "AUTO" mode, a user may modulate the brightness of the light bar 118 may pressing the brightness adjustment button 206. As shown in the control scheme method set forth in FIG. 12, the light bar 118 may implement different lighting functionality based on how the user presses the button. At Step 1202, the light bar determines if a button press has been received. If, at step 1204, it is affirmative that a button press has been received, at step 1206, the light bar is configured to determine what type of button press was made. If, at Step 1208, the user press and held the button 206, at step 1210, the light bar will modulate the brightness of the light on a continuum from brightest to darkest, or vice versa, until the user releases the button. In this manner, a user may utilize press and hold to turn the brightness up or down to any desired level. If, at step 121, the user instead implements a push and release button press, the light bar 118 will modulate the brightness between the brightest and dimmest settings, per button push. In this way, a user may utilize push and release to select between brightest and dimmest lighting levels with subsequent button presses, but cannot select a brightest in between such extremes, which must be accomplished using the press and hold methodology discussed herein.

Figure 13:
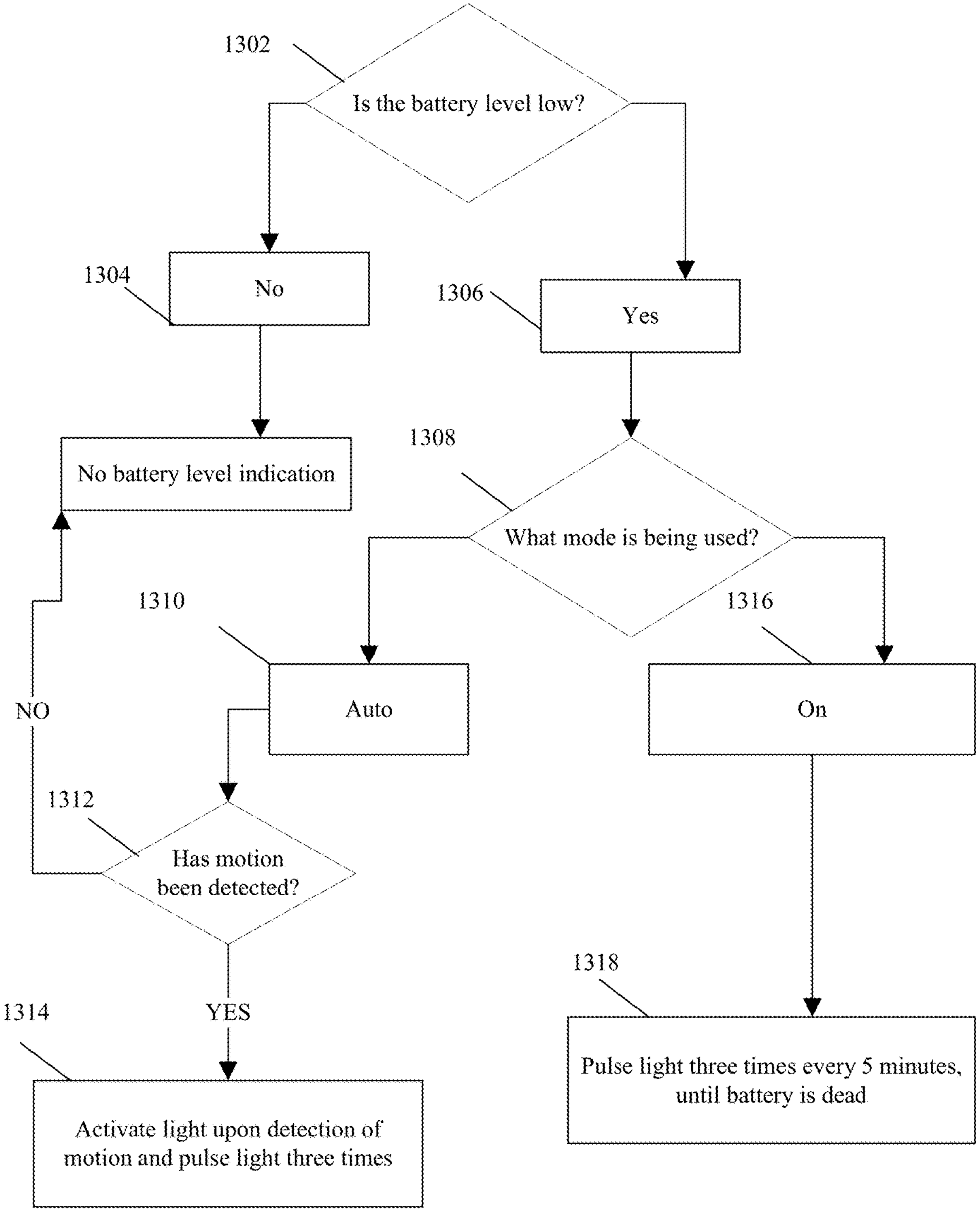
FIG. 13 is a flow chart of a low battery power indication control scheme method.

The light bar can also provide low battery feedback to a user. More specifically with reference to the control scheme method set forth in FIG. 13, at step 1302, the light bar 118 determines if the battery level is low. If the battery level is not low, i.e. at step 1304, then no battery level indication is provided. If the battery level is low at step 1306, then the light bar 118 determines which mode is being used. If the "Auto" mode is being used at step 1310, then the light bar 118 determines if motion has been detected at step 1312. If no motion has been detected, no battery level indication is provided. If motion has been detected, then, at step 1314, the light bar 118 activates the light upon detection of motion and pulses the light three times to inform the user that the battery level is low. If, instead, the mode being used is "On" at step 1316, then, at step 1318, the light bar pulses the light three times every 5 minutes, until the battery is dead and the light is no longer capable of illumination.

Figure 14:
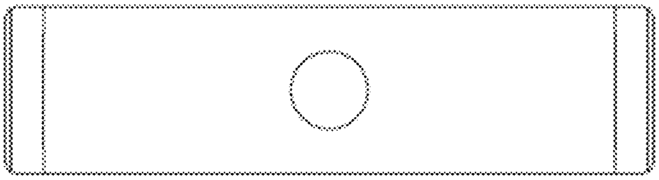
FIG. 14 is a front view of an embodiment of a light bar.
Figure 15:
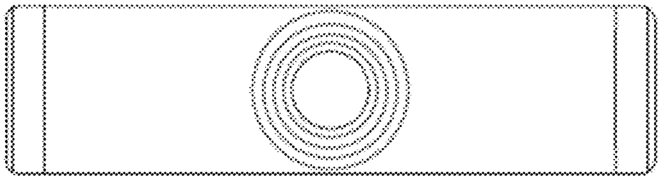
FIG. 15 is a front view of an embodiment of a light bar.
Figure 16:
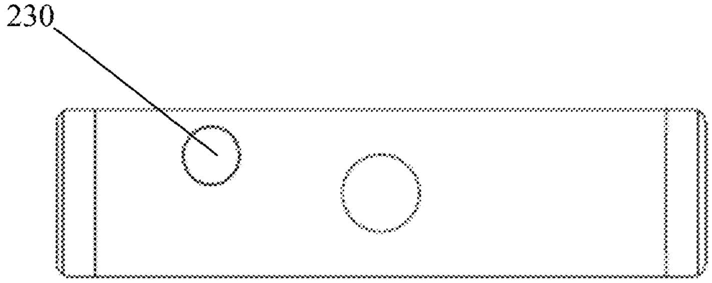
FIG. 16 is a front view of an embodiment of a light bar.

FIG. 14, FIG. 15, and FIG. 16 illustrate various front views of the light bar 118. FIG. 14 illustrates normal operation and FIG. 15 is an artist rendering of the light pulsing, as discussed regarding battery level indication above. FIG. 16 further discloses an indicator light 230 that can provide feedback to a user while the light bar 118 is being charged. Specifically, the indicator light 230 can illuminate red when the light bar 118 is being charged and can illuminate blue when the light bar 118 is fully charged.

Figure 17:
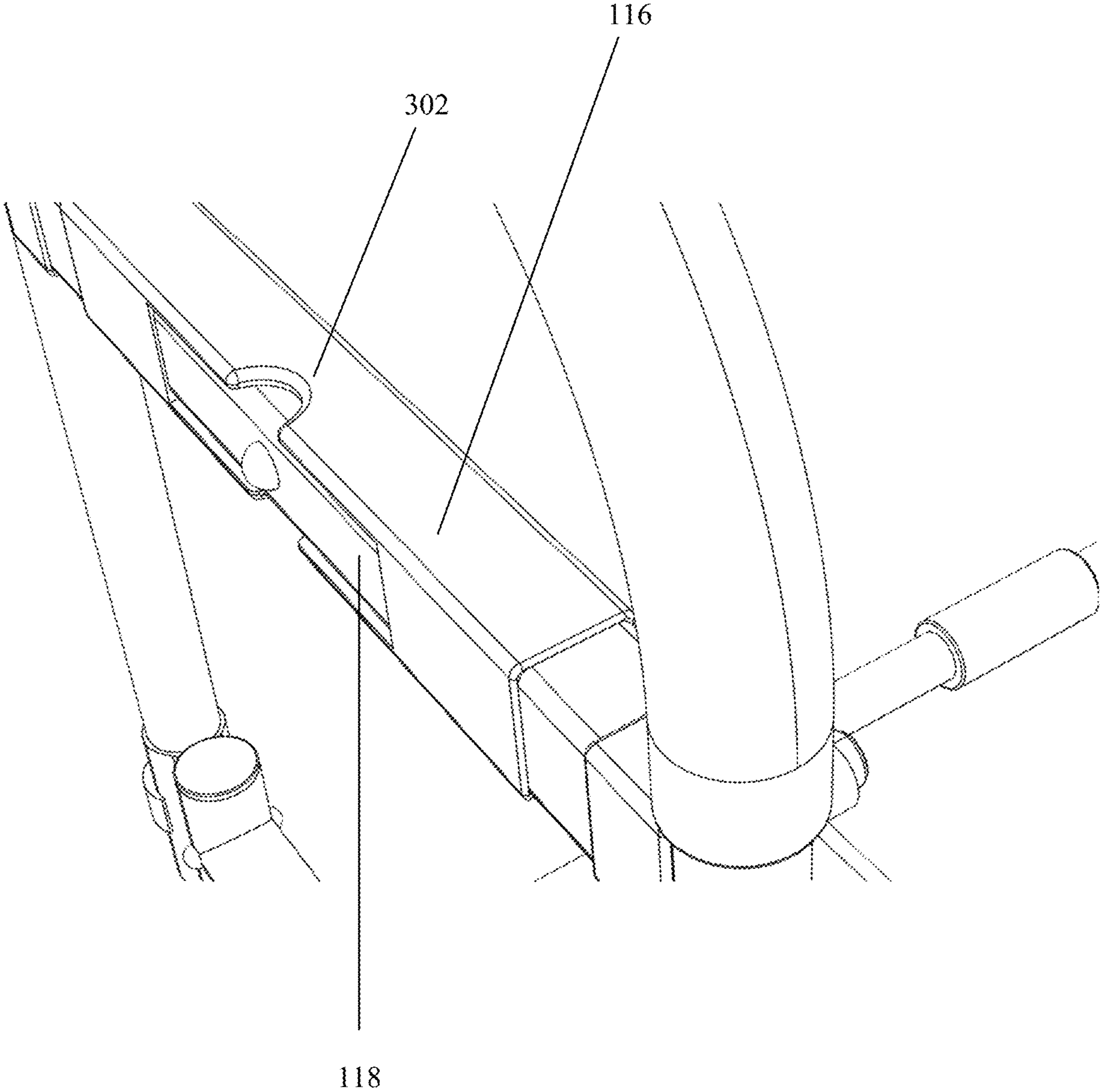
FIG. 17 is a top, right, and rear perspective view of a portion of an embodiment of a bed rail.
Figure 18:
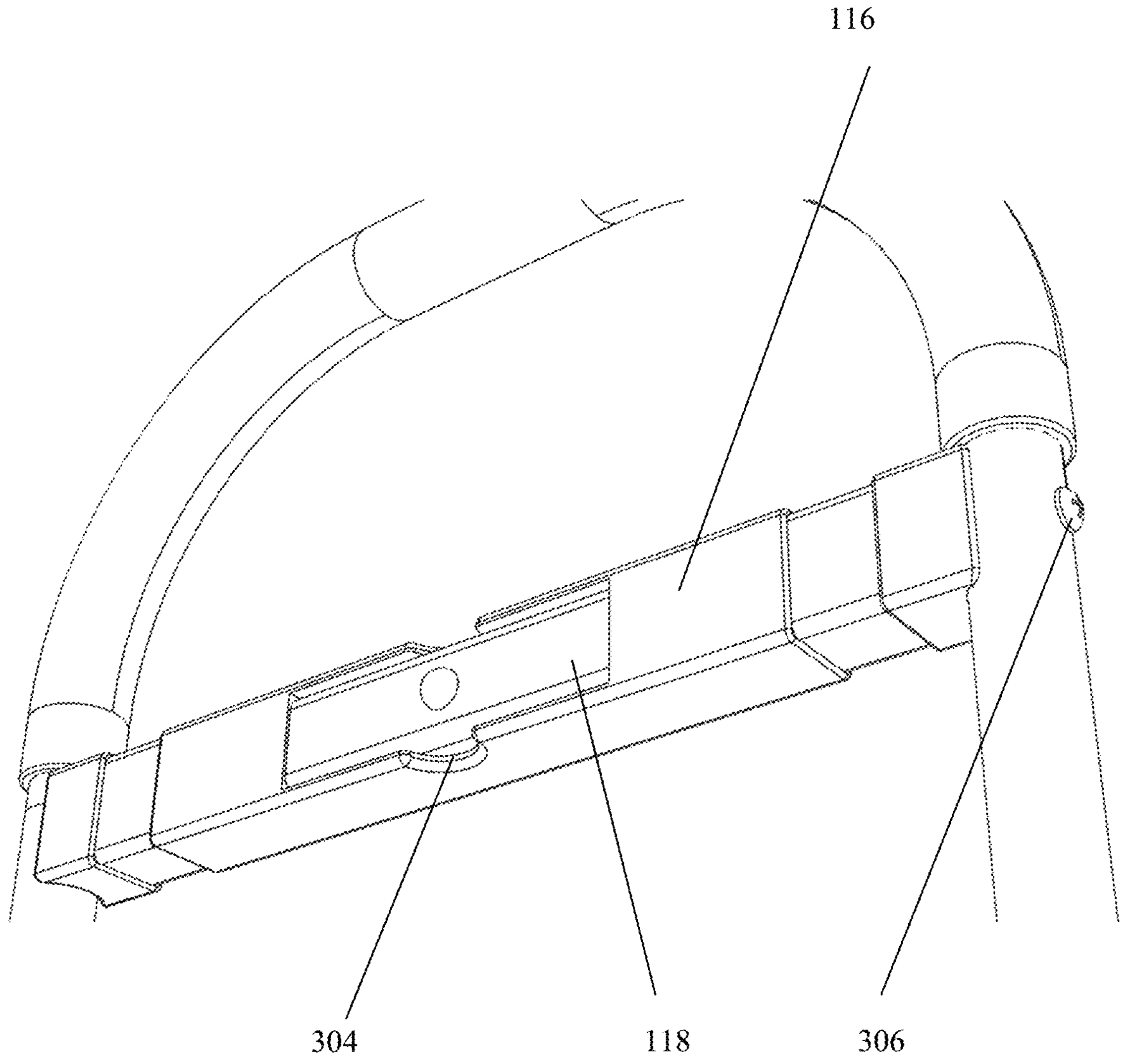
FIG. 18 is a rear perspective view of a portion of an embodiment of a bed rail.
Figure 19:
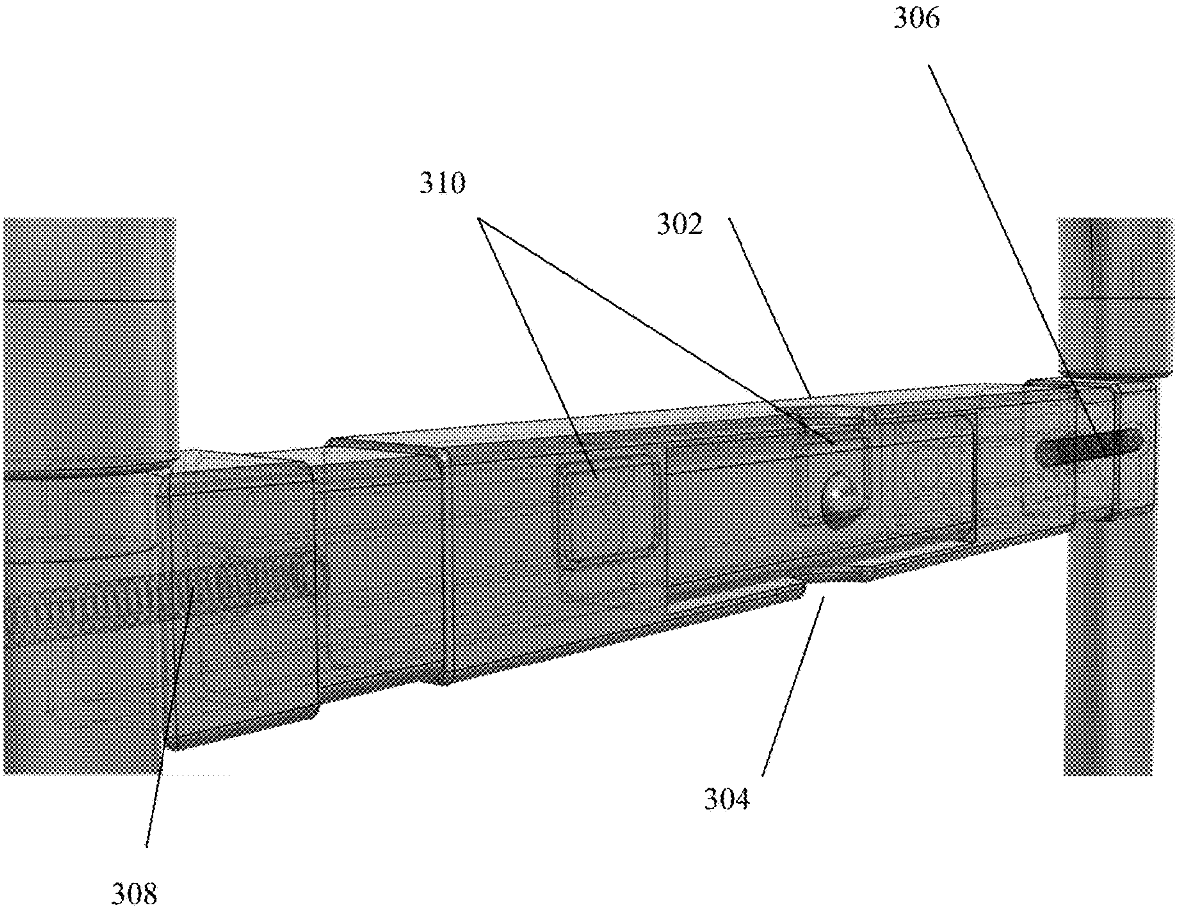
FIG. 19 is a rear perspective view of a portion of an embodiment of a bed rail, with transparent surfaces for detail.
Figure 20:
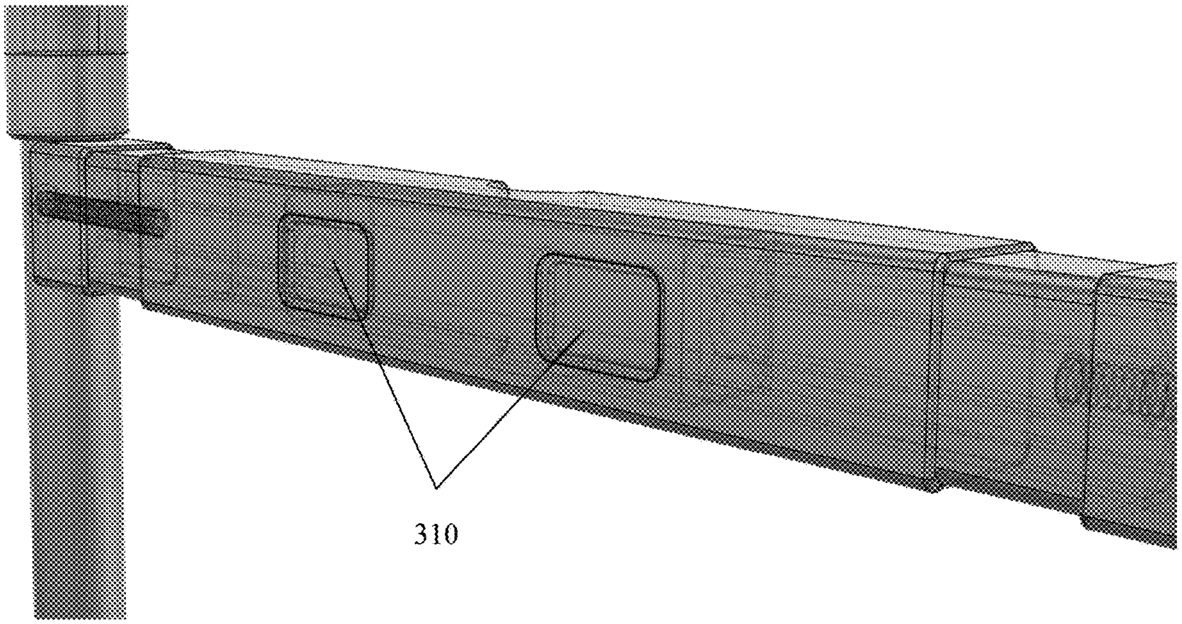
FIG. 20 is a rear perspective view of a portion of an embodiment of a bed rail, with transparent surfaces for detail.
Figure 21:
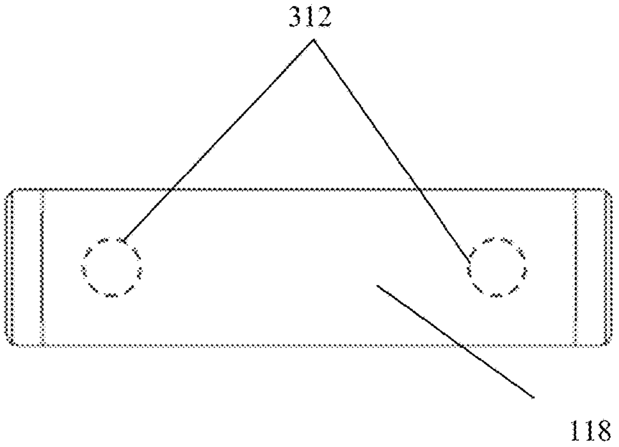
FIG. 21 is a rearview of an embodiment of a light bar.
Figure 22:
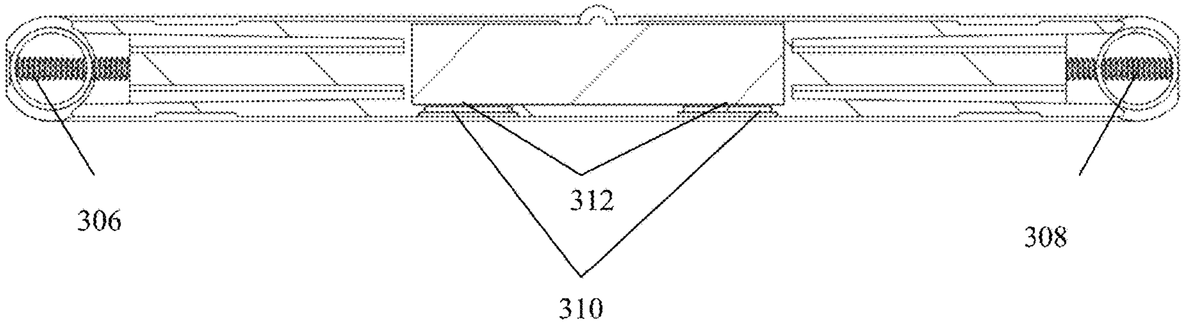
FIG. 22 is a top cross-sectional view of an embodiment of a bed rail.

Referring back to the upright member 110 and with reference to FIG. 17, the geometry of the upright member, and more specifically the cross member 116, can be configured to permit receipt of the light bar 118 and easy replacement. As shown in FIG. 17 and FIG. 18, the cross member 116 may include one or more semilunar cutouts 302, 304 on the top and/or bottom surface of the cross member, to permit a user to touch the light bar 118 and thereby remove it from the cross member 116 when desired. As shown in FIG. 18, the cross member 116 may also be removably coupled to the upright member 110 in some embodiments, e.g. by one or more fastening members or screws 306, 308. In some embodiments, the cross member 116 can be removed by removing the fastening members 306, 308. The cross member 116 can be rotated 180 degrees, reinstalled, and redirected in the opposite direction to allow the light bar 118 to be used to light the bed, which may allow users to use the light bar 118 as a reading light, or to allow caregivers to light a user for observation or attendance while said user is sleeping or resting.

Figure 23:
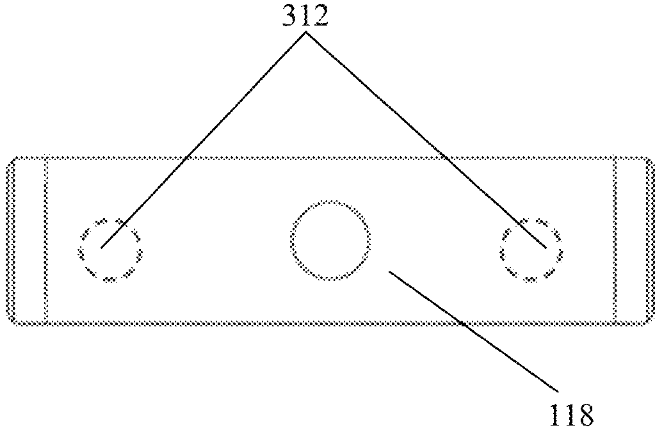
FIG. 23 is a front view of an embodiment of a light bar.
Figure 24:
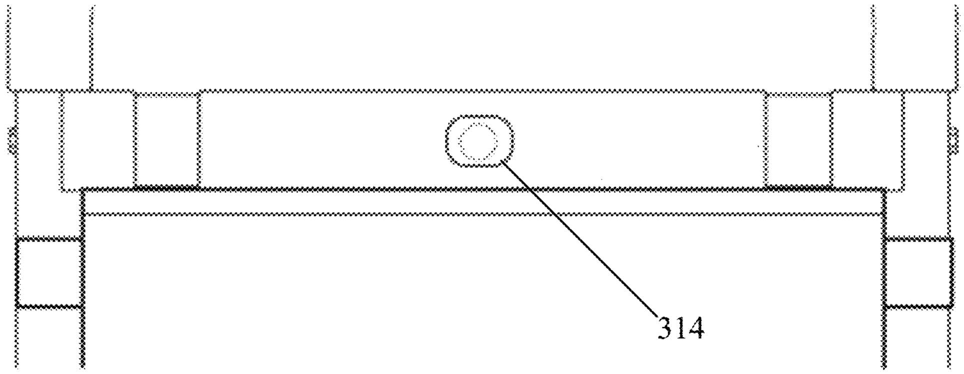
FIG. 24 is a rear perspective view of a portion of an embodiment of a bed rail.

The cross member 116 coupled to the upright member 110 may also be configured to secure the light bar 118 in place, to prevent inadvertent removals or dislodging. With reference to FIG. 19, FIG. 20, FIG. 21, and FIG. 22 the cross member 116 may include one or more magnets 310 disposed at the rear of the cavity or recess defined to receive the light bar 118. These magnets 310 can be paired with one or more attractive magnets 312 disposed on the light bar 118, such that, when the light bar is inserted into the cavity on the cross member 116, the light bar 118 is magnetically retained therein via the magnets of the light bar 118 and in the rear of the cross member 116. In some embodiments, the magnets 312 are superficially disposed on the light bar 118 (e.g. by application of a magnetic sticker), and, in other embodiments, are predisposed within the housing of the light bar 118. In an alternative embodiment shown in FIG. 23 and FIG. 24, the magnet(s) 312 coupled to or disposed within the light bar 118 may be positioned on the front of the light bar, adjacent to the light source. The light bar 118 may be rotated 180 degrees and inserted into the cavity in the cross member 116, with the light source facing inward to the bed, instead of away from a user's bed. To accommodate the directional change of lighting, the cross member 116 may include a cutout 314 configured to accept the light source 102 of light bar 118 and to allow the light to emit unimpeded. In some embodiments, the light bar 118 may have magnets positioned on the front and rear of the light bar, to facilitate easy rotation and interchangeability of light direction when desirable by a user or caregiver.

Embodiments described herein may be combined in a novel and inventive way to provide advantages that were not previously observed in the art. This disclosure should not necessarily be interpreted to be limited to only the embodiments shown and described, as embodiments described may appear differently than as shown, and drawings shown may be understood differently than as described.

What is claimed is:

1. A bed rail system for assisting a user with use on a bed, the bed rail system comprising:

a first pipe member:

a second pipe member disposed parallel to the first pipe member within the bed rail system, a removable cross member, the removable cross member comprising a first side, a second side, a third side, a fourth side, a first end, and a second end, the removable cross member coupled to the first pipe member at the first end and the removable cross member coupled to the second pipe member at the second end, the removable cross member comprising a hollow cavity defined within the first side; a first finger cutout defined within the second side; and a second finger cutout defined within the third side;

a light bar comprising a light source, the light bar configured to be removably disposed within the hollow cavity of the removable cross member.

2. The bed rail system of claim 1, wherein the light bar comprises a brightness adjustment button configured to permit the user to change the brightness of the light source.

3. The bed rail system of claim 1, wherein the light bar comprises a mode selector switch, the mode selector switch configured to engage a motion detection mode in low light environments.

4. The bed rail system of claim 1, further comprising a removable first screw disposed through the first pipe member and then into the first end of the removable cross member to couple the removable cross member to the first pipe member.

5. The bed rail system of claim 4, further comprising a removable second screw disposed through the second pipe member and then into the second end of the removable cross member to couple the removable cross member to the second pipe member.

6. A bed rail system for assisting a user with use on a bed, the bed rail system comprising: a u-shaped upright member; a removable cross member coupled to the u-shaped upright member; a light bar comprising a light source and at least one attractive magnet, the light bar configured to be removably and magnetically coupled to the removable cross member.

7. A bed rail system for assisting a user with use on a bed, the bed rail system comprising: an-vertically displaced sub-assembly, the vertically displaced sub-assembly comprising a first tube, a second tube disposed parallel to the first tube, and a connecting portion coupling the first tube and the second tube; a storage compartment coupled to the first tube of the vertically displaced sub-assembly at a first location and coupled to the second tube of the vertically displaced sub-assembly at a second location; a horizontally displaced cross member removably coupled to the first tube of the vertically displaced sub-assembly at a third location, the horizontally displaced cross member removably coupled to the second tube of the vertically displaced sub-assembly at a fourth location, wherein the third location and the fourth location are disposed vertically higher than the first location and the second location; and a light bar comprising a light source, the light bar removably coupled to the horizontally displaced cross member.

8. The bed rail system of claim 7, wherein the first tube, second tube, and connecting portion are monolithically formed together.

* * * * *